United States Patent [19]
Ooishi

[11] Patent Number: 5,802,538
[45] Date of Patent: Sep. 1, 1998

[54] SYSTEM FOR ENHANCED UTILITY OF CUSTOM CHARACTERS INCLUDING DIVIDING THE CUSTOM CHARACTERS INTO CUSTOM CHARACTER GROUPS AND ADAPTING THE CUSTOM CHARACTER GROUPS TO EACH OTHER

[75] Inventor: Isamu Ooishi, Shizuoka, Japan

[73] Assignee: Fujitsu Limited, Kawasaki, Japan

[21] Appl. No.: 630,245

[22] Filed: Apr. 10, 1996

[30] Foreign Application Priority Data

Jun. 26, 1995 [JP] Japan ................................ 7-159400

[51] Int. Cl.$^6$ .................................................. G06F 3/14
[52] U.S. Cl. ............................................. 707/542; 345/467
[58] Field of Search ........................... 395/805; 707/542; 345/467, 468, 471, 141

[56] References Cited

U.S. PATENT DOCUMENTS

| | | | |
|---|---|---|---|
| 5,367,618 | 11/1994 | Ishida | 395/145 |
| 5,432,899 | 7/1995 | Iwatani et al. | 395/145 |
| 5,444,829 | 8/1995 | Kawabata et al. | 395/100 |
| 5,533,174 | 7/1996 | Flowers, Jr. et al. | 395/114 |
| 5,583,978 | 12/1996 | Collins et al. | 395/170 |
| 5,600,770 | 2/1997 | Kawabata et al. | 395/805 |

FOREIGN PATENT DOCUMENTS

| | | |
|---|---|---|
| 5-165454 | 7/1993 | Japan . |
| 07028613 | 1/1995 | Japan . |
| 0727177 A | 10/1995 | Japan . |

Primary Examiner—Joseph H. Feild
Assistant Examiner—Stephen Hong
Attorney, Agent, or Firm—Staas & Halsey

[57] ABSTRACT

A system for enhanced utility of custom characters in a distributed data processing system allows document data to be distributed from a source system fully capable of handling many custom character codes to a target system capable of handling a limited number of custom character codes and ensures the received custom characters to be correctly displayed and printed in the target system. The source system divides the custom characters available in the source system into a plurality of custom character groups. The number of custom character codes included in each custom character group is adjusted to be less than or equal to the number of custom character codes that the target system can handle. Then, the source system creates custom character environments for the respective custom character groups. The target system sets up one of the custom character environments in the target system. The target system displays or prints out the document data sent from the source system under the custom character environment set in the target system.

7 Claims, 19 Drawing Sheets

[ SOURCE SYSTEM ]

[ TARGET SYSTEM ]

FIG. 7(A)

| RECORD NUMBER | CUSTOMER NAME | ADDRESS | REPRESENTATIVE |
|---|---|---|---|
| 1 | α · · · | β · · · | · · · |
| 2 | · · · α | β · · · | · · · |
| 3 | · · · · | β · · · | · γ · |

FIG. 7(B)

| CUSTOM CHARACTER CODE | NUMBER OF INSTANCES | RECORD NUMBER |
|---|---|---|
| 80A1 | 2 | 1, 2 |
| 80A2 | 3 | 1, 2, 3 |
| 80A3 | 1 | 3 |

| ORDER OF FREQUENCY IN USE | 1 | 2 | 3 | ... | m | m+1 | m+2 | m+3 | ... | 2000 |
|---|---|---|---|---|---|---|---|---|---|---|
| CUSTOM CHARACTER CODE | A0FE | 9AA0 | 85A1 | ... | 83A1 | A0AA | 91A0 | 87A1 | ... | 88A3 |
| NUMBER OF INSTANCES | 93 | 80 | 65 | ... | 7 | 6 | 5 | 4 | ... | 1 |

FIG. 10

| RECORD NUMBER | LESS-FREQUENT CUSTOM CHARACTER CODES INCLUDED IN RECORD |
|---|---|
| 1 | NONE |
| 2 | NONE |
| ~ | ~ |
| 15 | A0AA, 87A1 |
| 17 | NONE |
| 18 | 88A3 |
| ~ | ~ |
| 273 | A0AA |

FIG. 11

| RECORD NUMBER | LESS-FREQUENT CUSTOM CHARACTER CODES INCLUDED IN RECORD | SPECIFIC CUSTOM CHARACTER SET FOR GROUP #1 | SPECIFIC CUSTOM CHARACTER SET FOR GROUP #2 | SPECIFIC CUSTOM CHARACTER SET FOR GROUP #3 |
|---|---|---|---|---|
| 1 | NONE | | | |
| 2 | NONE | | | |
| ~ | ~ | | | |
| 89 | 91A0 | | | |
| 90 | NONE | | | |
| ~ | ~ | | | |
| 145 | A0AA | | | |
| 146 | 87A1, 91A0 | | | |
| ~ | ~ | | | |
| 273 | A0A1 | | | |

FIG. 12

| GROUP NUMBER | RECORD RANGE |
|---|---|
| 1 | 1~89 |
| 2 | 90~145 |
| 3 | 146~273 |

FIG. 16

SYSTEM FOR ENHANCED UTILITY OF CUSTOM CHARACTERS INCLUDING DIVIDING THE CUSTOM CHARACTERS INTO CUSTOM CHARACTER GROUPS AND ADAPTING THE CUSTOM CHARACTER GROUPS TO EACH OTHER

BACKGROUND OF THE INVENTION

1. Field of the Invention

The present invention relates to a system for enhanced utility of custom characters in a distributed data processing system, and more specifically, to a system for enhanced utility of custom characters in a distributed data processing system which allows document data to be distributed from a source system fully capable of handling many custom character codes to a target system only capable of handling a limited number of custom character codes.

2. Description of the Related Art

In a character set, characters fully defined in the set are called "standard characters" and, in contrast, characters whose graphical images are not defined in the original set but user-definable are called "custom characters." When trying to circulate document data for use in a distributed linguistic information processing system utilizing a plurality of different character coding systems, it will be a problem how to harmonize their different methods of handling the custom characters.

In a conventional method to deal with this problem, a source system distributes document data after changing its character codes using a code conversion table so as to meet with another character coding system used in target systems. This code conversion table supports the custom characters as well, and the source system distributes pattern data of that custom character set together with the document data to the target systems. The target systems can install the character codes defined by the source system as custom characters, thereby enabling the distributed processing system to handle the custom characters in a consistent way.

The above-described conventional processing method, however, presupposes that the target systems can handle the same number of custom character codes as that the source system can. The method remains valid as long as this condition is met, however, a problem will arise if the number of usable custom character codes on one system is different from the other system(s).

Therefore, in a distributed linguistic information processing system including a plurality of different character coding systems, data distribution will be accomplished without any problem if the data is sent from a less capable system to a more capable system in terms of ability of handling the custom character codes. However, the data distribution in the opposite direction will cause a problem such that the target systems cannot display or print out some of the custom characters contained in the received document data.

SUMMARY OF THE INVENTION

An object of the present invention is to provide a system for enhanced utility of custom characters, which allows document data to be distributed from a source system fully capable of handling many custom character codes to a target system only capable of handling a limited number of custom character codes and thereby ensures the custom characters contained in the document data to be correctly displayed and printed out in the target system.

To accomplish the above object, according to the present invention, there is provided a system for enhanced utility of custom characters in a distributed data processing system, which allows document data to be distributed from a source system with full capability to handle custom character codes to a target system with limited capability to handle the custom character codes. The system comprises the following four means. First, custom character grouping means disposed in the source system divides the custom characters available in the source system into a plurality of custom character groups. The number of custom character codes included in each custom character group is adjusted not to be greater than the number of custom character codes that the target system can handle. Second, custom character environment creating means disposed in the source system creates a plurality of custom character environments for the respective custom character groups. Third, custom character environment setting means disposed in the target system sets up one of the custom character environments in the target system. Lastly, document data processing means disposed in the target system processes the document data sent from the source system under the custom character environment set up by the custom character environment setting means.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 7(A) and 7(B) are diagrams respectively showing a customer list and a custom character log file;

FIG. 10 is a diagram showing the custom characters arranged in the order of frequency in use;

FIG. 11 is a diagram showing usage of less-frequent custom characters classified in each record;

FIG. 12 is a diagram showing grouping of the less-frequent custom characters;

FIG. 16 is a diagram showing the records corresponding to the groups;

DESCRIPTION OF THE PREFERRED EMBODIMENTS

An embodiment of the present invention will be described below with reference to the accompanied drawings.

Figure 1A:
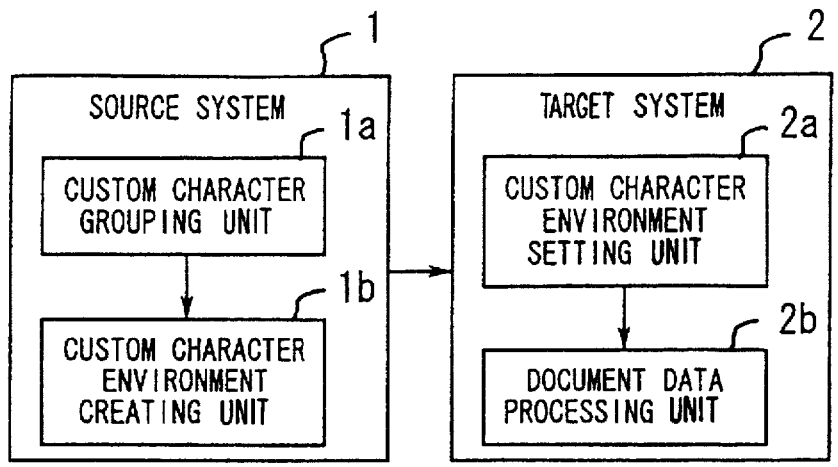
FIGS. 1(A) and 1(B) are diagrams respectively showing a conceptual view of and a principle of operation of the present invention.
Figure 1B:
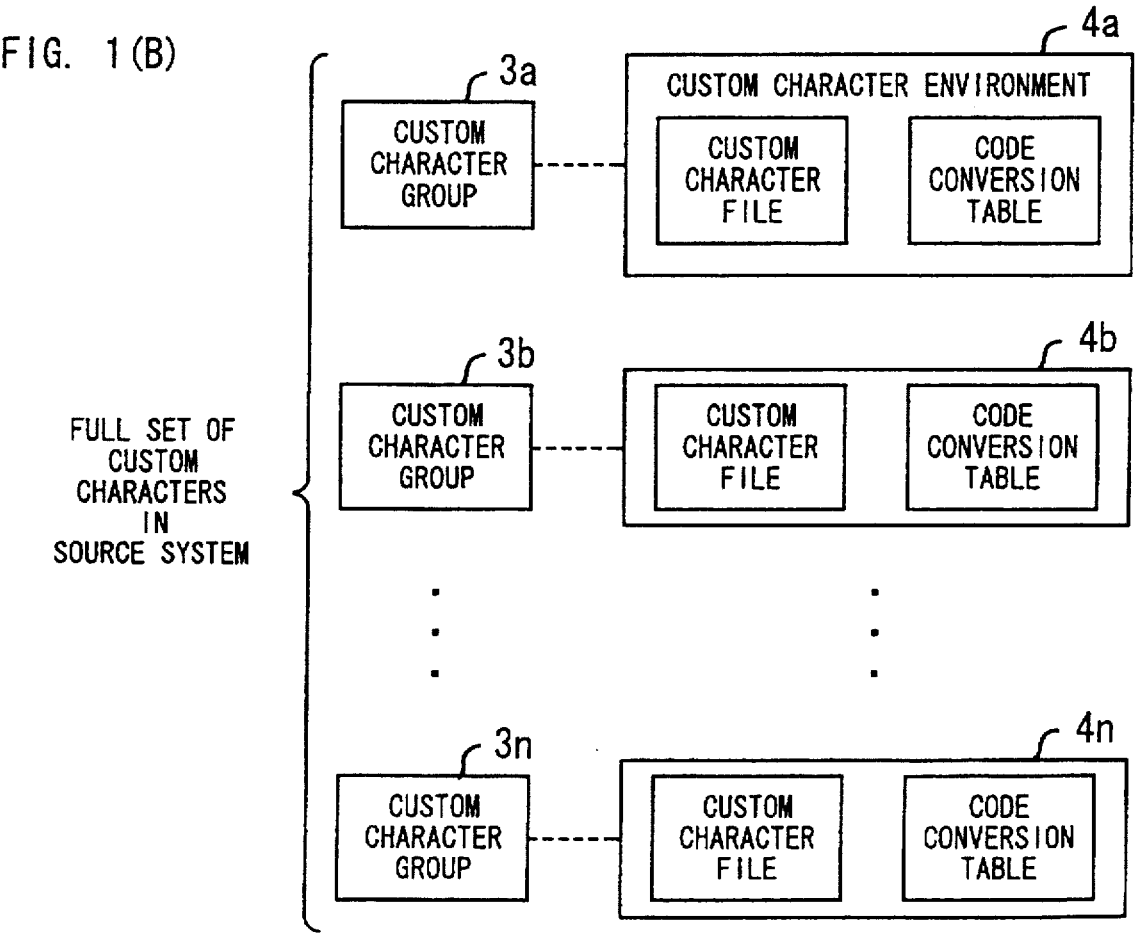

First, the concept of the present invention will be described below with reference to FIGS. 1(A) and 1(B).

In a distributed data processing system according to the present invention, document data containing some custom characters is distributed from a source system 1 to a target system 2. It is assumed that the target system 2 is less capable than the source system 1 in terms of the number of usable custom character codes, and that those two systems use different character coding systems.

The present embodiment comprises the following four main elements. The first element is custom character grouping unit 1a, disposed in the source system 1, for dividing the custom character codes available in the source system 1 into a plurality of custom character groups 3a–3n. The number of custom character codes included in each group is adjusted not to be greater than the number of custom character codes that the target system 2 can handle. The second element is custom character environment creating unit 1b, disposed in the source system 1, for creating different custom character environments 4a–4n corresponding to the respective custom character groups 3a–3n. Each of the custom character environments 4a–4n has a custom character file and font pattern data specific to each custom character group. The third element is custom character environment setting unit 2a, disposed in the target system 2, for setting up one of the custom character environments 4a–4n in the target system 2. The fourth element is document data processing unit 2b, disposed in the target system 2, for processing the document data received from the source system 1 under the custom character environment set up by the custom character environment setting means 2a.

Figure 2:
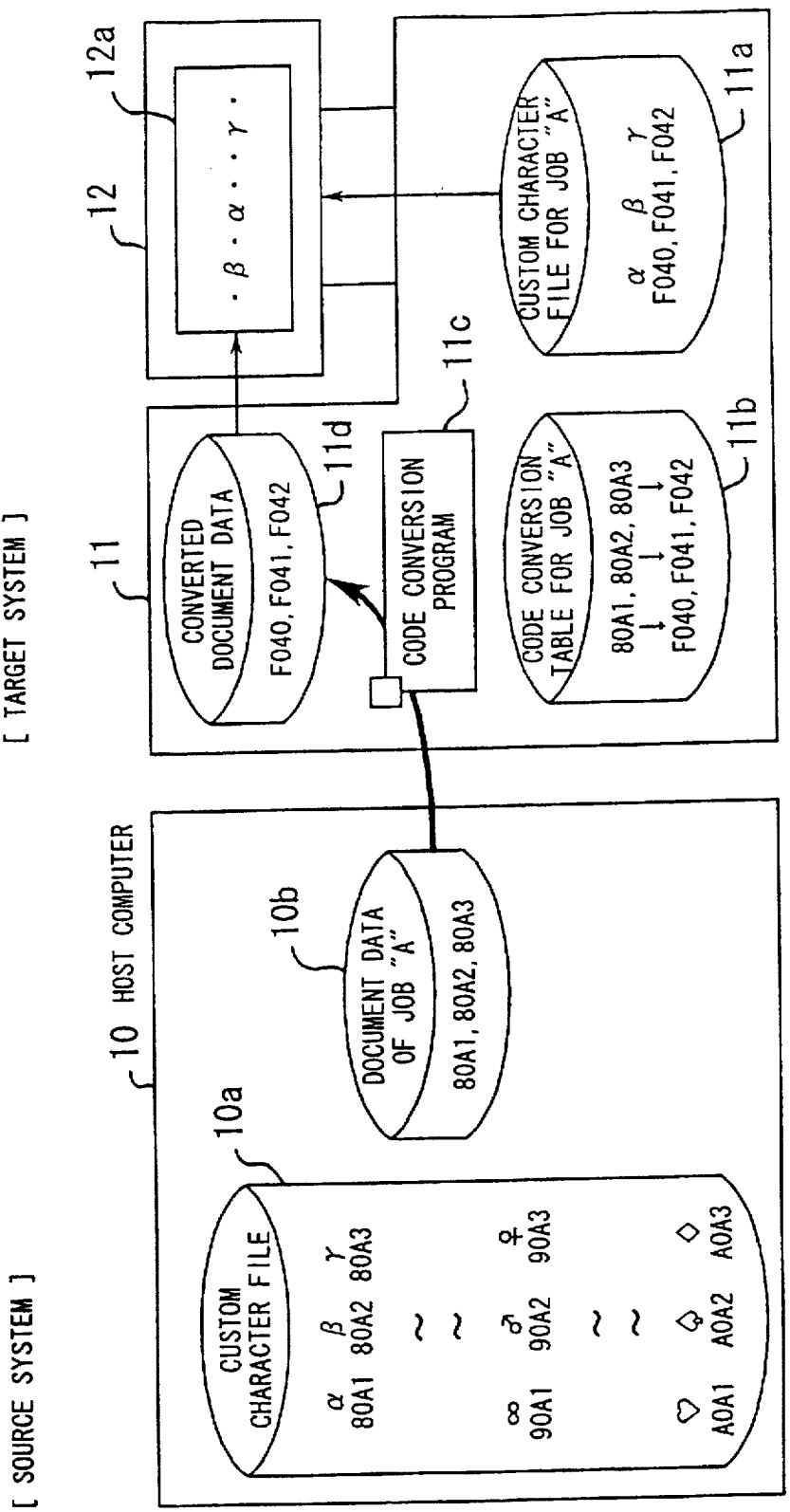
FIG. 2 is a diagram showing a total system.

FIG. 2 illustrates a specific structure of the distributed data processing system as outlined above. The source system 1 in FIG. 1 is realized as a host computer 10 in FIG. 2, and the target system 2 is constructed as a personal computer 11 with a display unit 12. The host computer 10 provides functions of the custom character grouping means 1a and custom character environment creating means 1b in the source system 1 shown in FIG. 1, and the personal computer 11 serves as the custom character environment setting means 2a and document data processing means 2b in the target system 2 shown in FIG. 1.

The host computer 10 stores a custom character file 10a which contains font pattern data and character codes for 3,102 custom characters, for instance. FIG. 2 illustrates many custom characters "α, β, γ, . . . ∞, 515, 516, . . ." registered in the source system 1, where a symbol "α" represents font pattern data of a custom character α and a hexadecimal number 80A1 shows a character code thereof.

Since the host computer 10 is assigned a variety of jobs coming out from business activities in the organization that it is working for, a lot of custom characters are required in total to compose various document data related to the jobs. However, focusing upon a single job, the document data does not contain so many custom characters. This fact will justify the assumption that the custom character codes contained in the custom character file 10a can be divided into the following three groups: group #1 including the character codes 80A1, 80A2, and 80A3; group #2 including the codes 90A1, 90A2, and 90A3; and group #3 including the codes A0A1, A0A2, and A0A3. Further, it is assumed that document data 10b related to a job "A" is composed in the host computer 10 using some of the custom characters defined in the custom character file 10a. More specifically, it is assumed that the custom characters used in the document data 10b are only of the custom character group #1.

FIG. 2 shows that the document data 10b contains the codes 80A1, 80A2, and 80A3 for symbols "α," "β," and "γ." Such document data 10b for the job "A" is now distributed to the personal computer 11 serving as the target system 2 via a network (not shown).

Here, the personal computer 11 can handle only 1,880 custom character codes, for example. This restriction brings another restriction such that the number of custom character codes in each of the above-described three groups should be 1,880 at most. The personal computer 11 stores some custom character files and code conversion tables that have been previously supplied to support the respective custom character groups. The custom character file contains font pattern data and their local character codes to be used in the personal computer 11. The code conversion table associates the character coding system in the host computer 10 with that in the personal computer 11 including the correspondence between the two sets of the custom characters in each group.

In such a situation, the personal computer 11 selects one of the three custom character groups suitable for the document data 10b and reads the custom character file and code conversion table for the selected group into a predetermined memory area. FIG. 2 illustrates a custom character file 11a and code conversion table 11b for a specific job "A" loaded in the predetermined area. The personal computer 11 then executes a code conversion program 11c with reference to the code conversion table 11b to translate the custom character codes in the original document data 10b, thus obtaining a converted document data 11d. Through this process, the custom character codes 80A1, 80A2, and 80A3 contained in the original document data 10b have been converted to the local codes F040, F041, and F042. When displaying the converted document data lid on a screen 12a of a display unit 12, the personal computer 11 will refer to the custom character file 11a for the job "A" to rasterize the corresponding custom character symbols "β, α, γ" on the screen 12a as shown in FIG. 2, where a symbol indicates a standard character.

Figure 3:
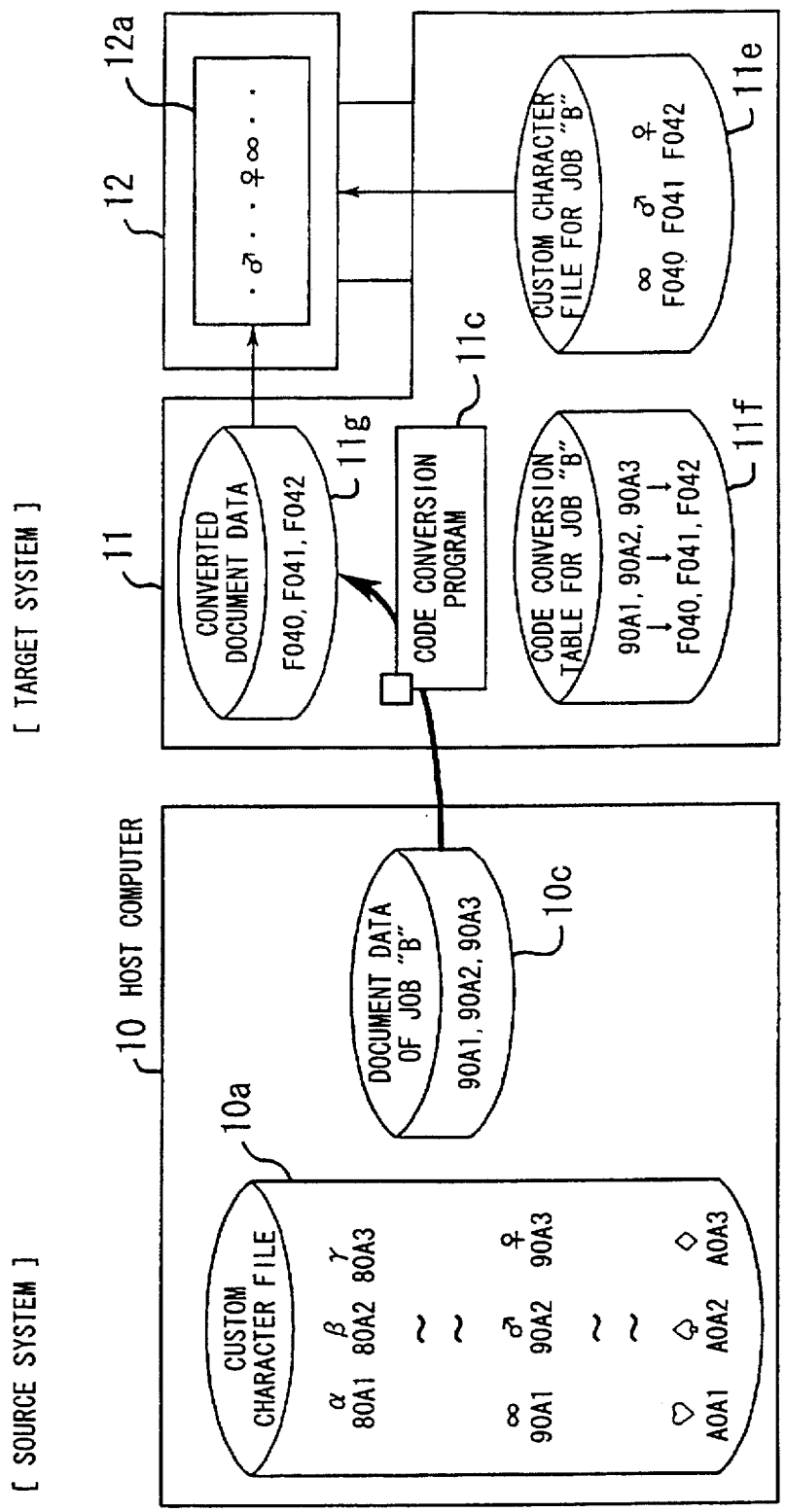
FIG. 3 is another diagram showing the total system.

FIG. 3 shows another situation in the same distributed data processing system, in which the host computer 10 has produced document data 10c related to another job "B" and sent it to the personal computer 11. The document data 10c produced in the host computer 10 uses some custom characters stored in the custom character file 10a. In more detail, the custom characters contained in the document data 10c are only of the custom character group #2, such as the codes 90A1, 90A2, and 90A3 for symbols "∞," "♂," and "♀," respectively. Such document data 10c for the job "B" is now distributed to the personal computer 11 serving as the target system 2 via a network (not shown).

The personal computer 11 selects one of the three custom character groups suitable for the document data 10c and reads the custom character file and code conversion table for the selected group into the predetermined area. FIG. 3 illustrates a custom character file 11e and code conversion table 11f for the job "B" loaded in the predetermined area. The personal computer 11 then executes a code conversion program 11c with reference to the code conversion table 11f to translate the custom character codes in the original document data 10c, thus obtaining a converted document data 11g. Through this conversion process, the custom character codes 90A1, 90A2, and 90A3 contained in the original document data 10c have been converted to the local codes F040, F041, and F042. Note here that the same local codes as in FIG. 2 are used to replace the original custom character codes in the document data 10c, which are different from those in the document data 10b. This is because the personal computer 11 can handle only a limited number of custom character codes. When displaying the converted document data 11g on the display unit 12, the personal computer 11 refers to the custom character file 11e for the job "B" to rasterize the corresponding custom characters "♂, ♀, ∞," as shown in the screen 12a of FIG. 3.

Figure 4:
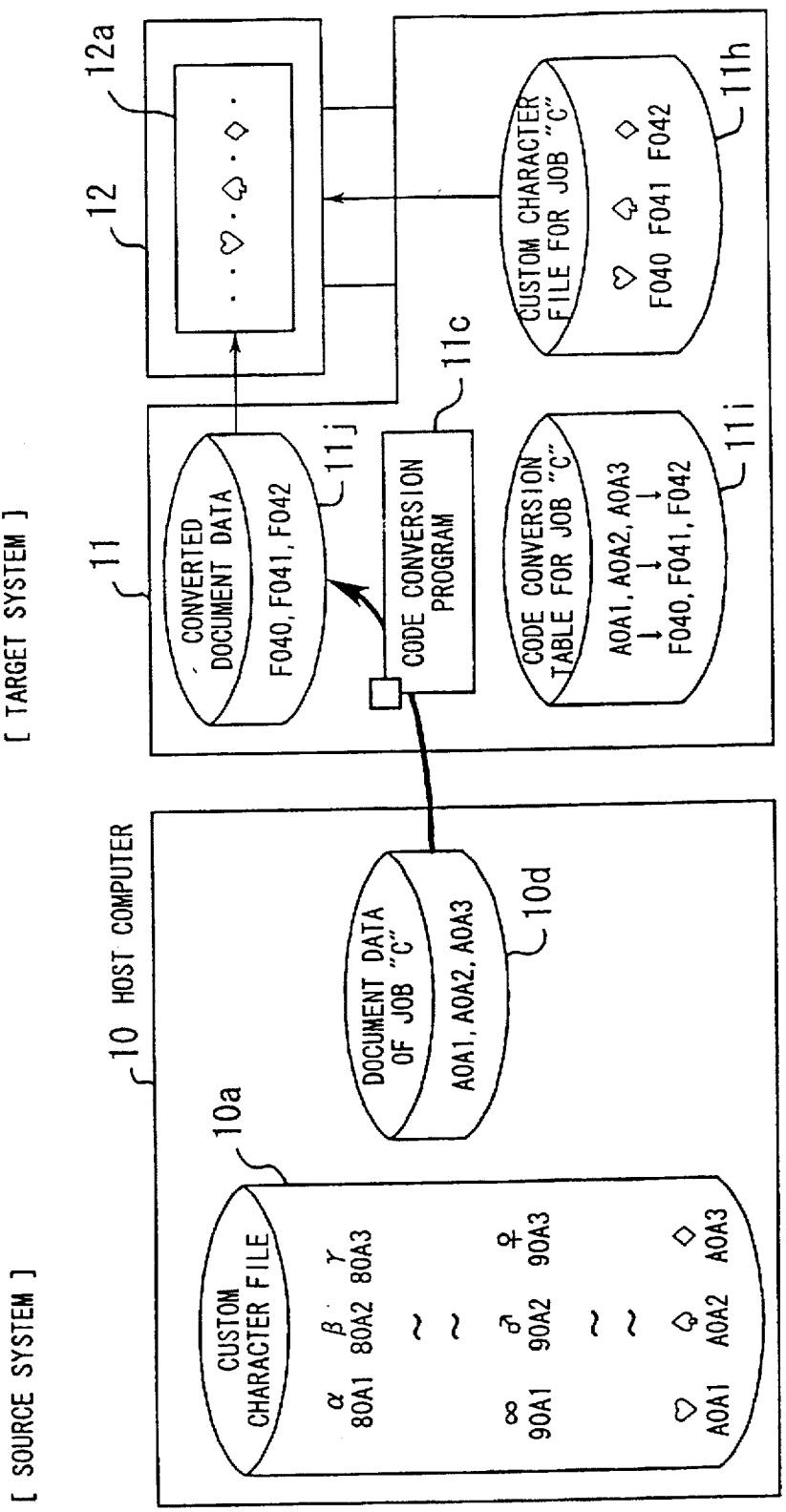
FIG. 4 is yet another diagram showing the total system.

FIG. 4 shows still another situation in the same distributed data processing system, in which the host computer 10 has produced document data 10d related to still another job "C" and sent it to the personal computer 11. The document data 10d produced in the host computer 10 uses some custom characters stored in the custom character file 10a. More specifically, the custom characters contained in the document data 10d belong only to the custom character group #3, such as the codes A0A1, A0A2, and A0A3. Such document data 10d for the job "C" is distributed to the personal computer 11 serving as the target system 2 via a network (not shown).

The personal computer 11 selects one of the three custom character groups suitable for the document data 10d and reads the custom character file and code conversion table of the selected group into the predetermined area. FIG. 4 illustrates such a custom character file 11h and code conversion table 11i for the job "C" loaded in the predetermined area. The personal computer 11 then executes the code conversion program 11c with reference to the code conversion table 11i to translate the custom character codes in the original document data 10d, thus obtaining a converted document data 11j. Through this conversion process, the custom character codes A0A1, A0A2, and A0A3 contained in the original document data 10d are converted to the local codes F040, F041, and F042. Note that the same codes F040, F041, and F042 shown in FIGS. 2 and 3 are used here again to represent the original custom characters in the document data 10d, which are different from those in the document data 10b or 10c, because the personal computer 11 can handle only a limited number of custom character codes. When displaying the converted document data 11j on the display unit 12, the personal computer 11 refers to the custom character file 11h for the job "C" to provide the screen 12a with the font pattern data corresponding to the custom character codes A0A1, A0A2, and A0A3 in the host computer 10.

Next, the following description will devote to a procedure of grouping the custom characters defined in the custom character file 10a.

Figure 5:
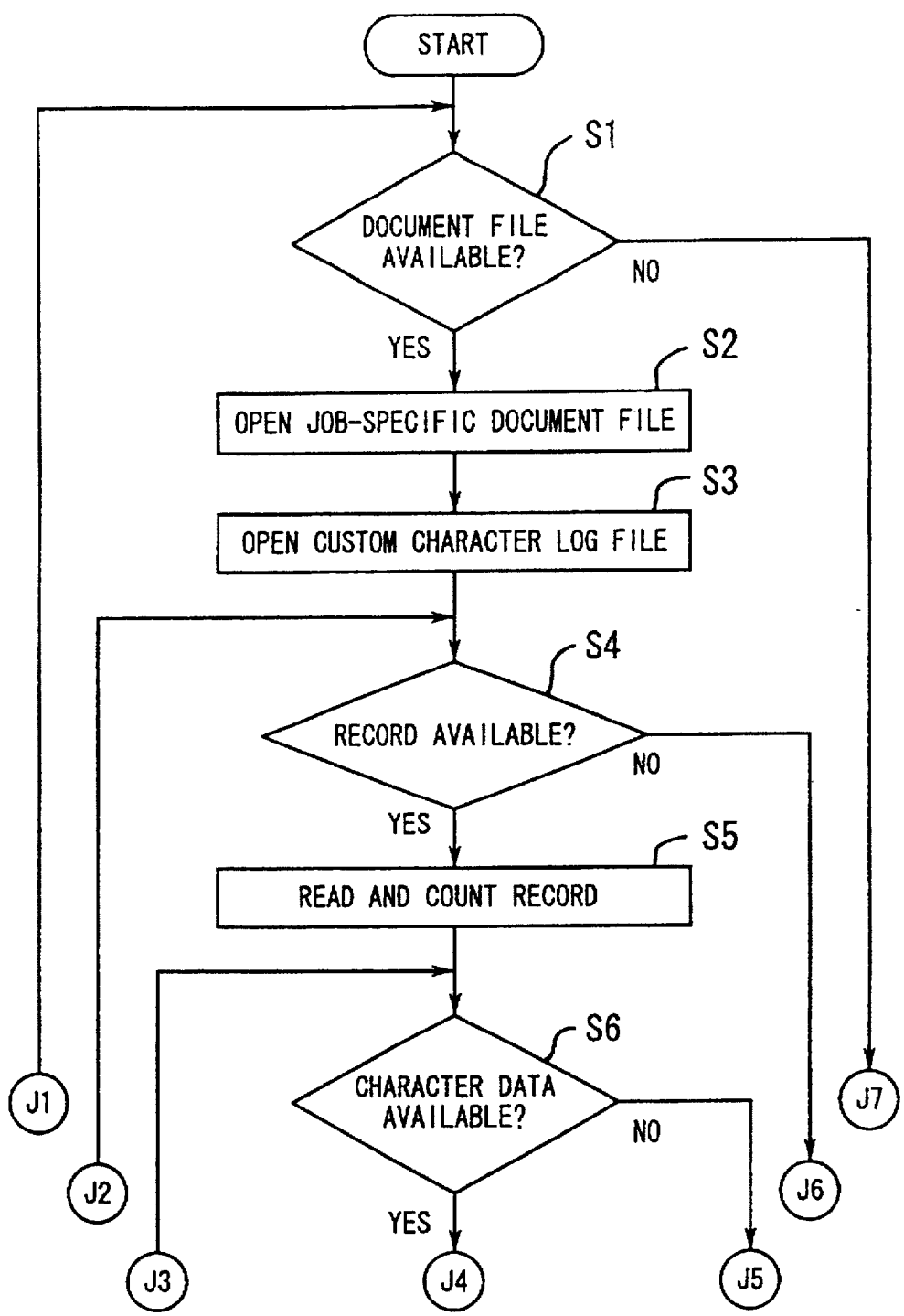
FIGS. 5 and 6 are a first and second halves of flowchart showing a procedure of examining custom characters in their frequency in use.
Figure 6:
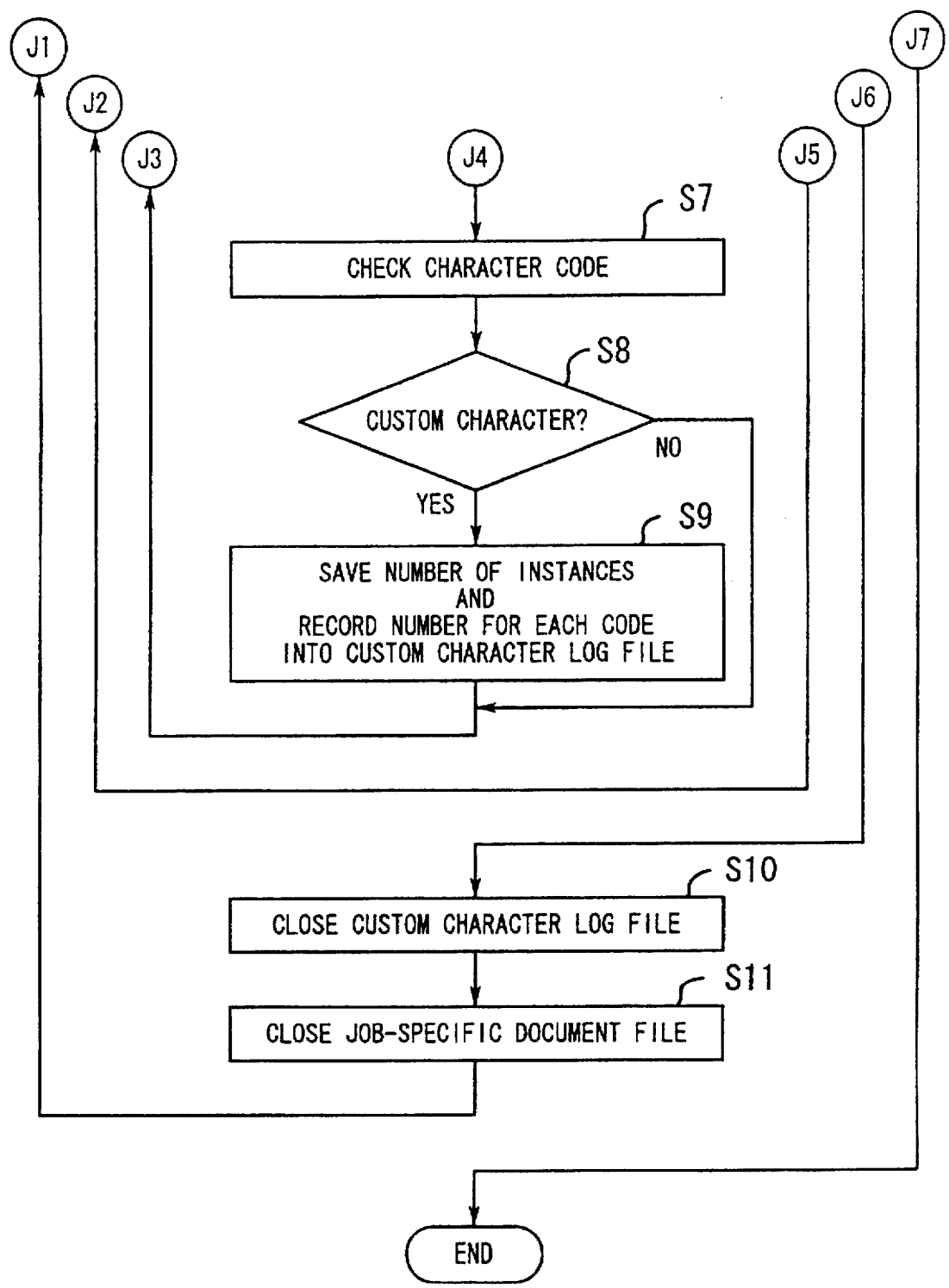

The host computer 10 carries out a survey on the frequency in use of each custom character in advance to grouping the custom characters. FIGS. 5 and 6 are two halves of a flowchart showing a procedure of this frequency survey, which is carried out for each document file that contains business documents created for each job. The survey proceeds as the following steps:

[S1] Since the survey is directed at each document file classified by the type of jobs (or job-specific document file), it is first tested whether or not any unfinished document file is available for further survey on the frequency in use of the custom character codes. If there is an unfinished file, the process advances toward the next step S2, and if the survey of the job-specific document files has all finished, the process is terminated.

[S2] One of the unfinished job-specific document files is opened for the frequency survey. For example, a document file for the job "A" (shortened hereafter as the document file "A"), which is actually a customer list containing company names, addresses, representative persons, etc., is opened. The following steps will be described using this example.

[S3] For use in the frequency survey, there are provided a plurality of custom character log files correspondent to the respective jobs. In this step S3 the host computer 10 opens one of those custom character log files corresponding to the job under survey. This custom character log file has some columns such as custom character code, number of instances, and record number.

[S4] The document file "A," or the customer list, lists customer data as shown in FIG. 7(A). Each customer data is called a "record" and each record is identified by a sequential "record number" starting from the top record as #1. The frequency survey proceeds record by record. In step S4, the host computer 10 tests whether any such record is available or not. If there is an unfinished record, the process advances to the next step S5 and, if all the records in the document file "A" have finished, the process jumps to step S10.

[S5] The host computer 10 reads in the record and recognizes its record number by counting the number of read records.

[S6] In the minor loop of S6-S10, the host computer 10 examines each character in the read record to find whether the character is a custom character or not. At the beginning of this minor loop process, the host computer 10 first checks whether any unfinished character data is available in the record or not. If there is any unfinished character data, the process advances to the next step S7 and, if all the character data have been tested, then the process returns to step S4.

[S7] It is tested whether the character data under test is a custom character or not, by consulting the custom character file 10a shown in FIG. 2. As to the record #1 in FIG. 7(A), for example, the test will result in detection of two custom characters "α" and "β."

[S8] If the character data under test is found to be a custom character as a result of step S7, the process advances to the next step S9, and otherwise, the process returns to step S6.

[S9] Concerning the found custom character, the host computer 10 writes the number of its instances in the document file and the record numbers relevant thereto into the selected custom character log file, classifying them with the custom character code. For example, the survey of the customer list shown in FIG. 7(A) will teach that the custom character "α" is used once in each of the records #1 and #2, and this result of the survey will be recorded in the custom character log file as shown in FIG. 7(B). That is, the number of instances "2" and the record numbers "1" and "2" are written in the row of the custom character code 80A1 corresponding to the custom character "α."Similarly, as to the custom character "β," the number of instances "3" and the record numbers "1," "2," and "3" are written in the row of the code 80A2. Further, as to the custom character "γ," the number of instance "1" and the record number "3" are written in the row of the code 80A3.

[S10] The host computer 10 closes the custom character log file that was opened in step S3.

[S11] The host computer 10 closes the job-specific document file that was opened in step S2.

Through the above-described process, the job-specific custom character log file finally obtains the following information regarding the corresponding job-specific document file as: custom character codes used therein, the frequency in use of each custom character, and a list of the record numbers indicative of where each custom character is used.

Figure 8:
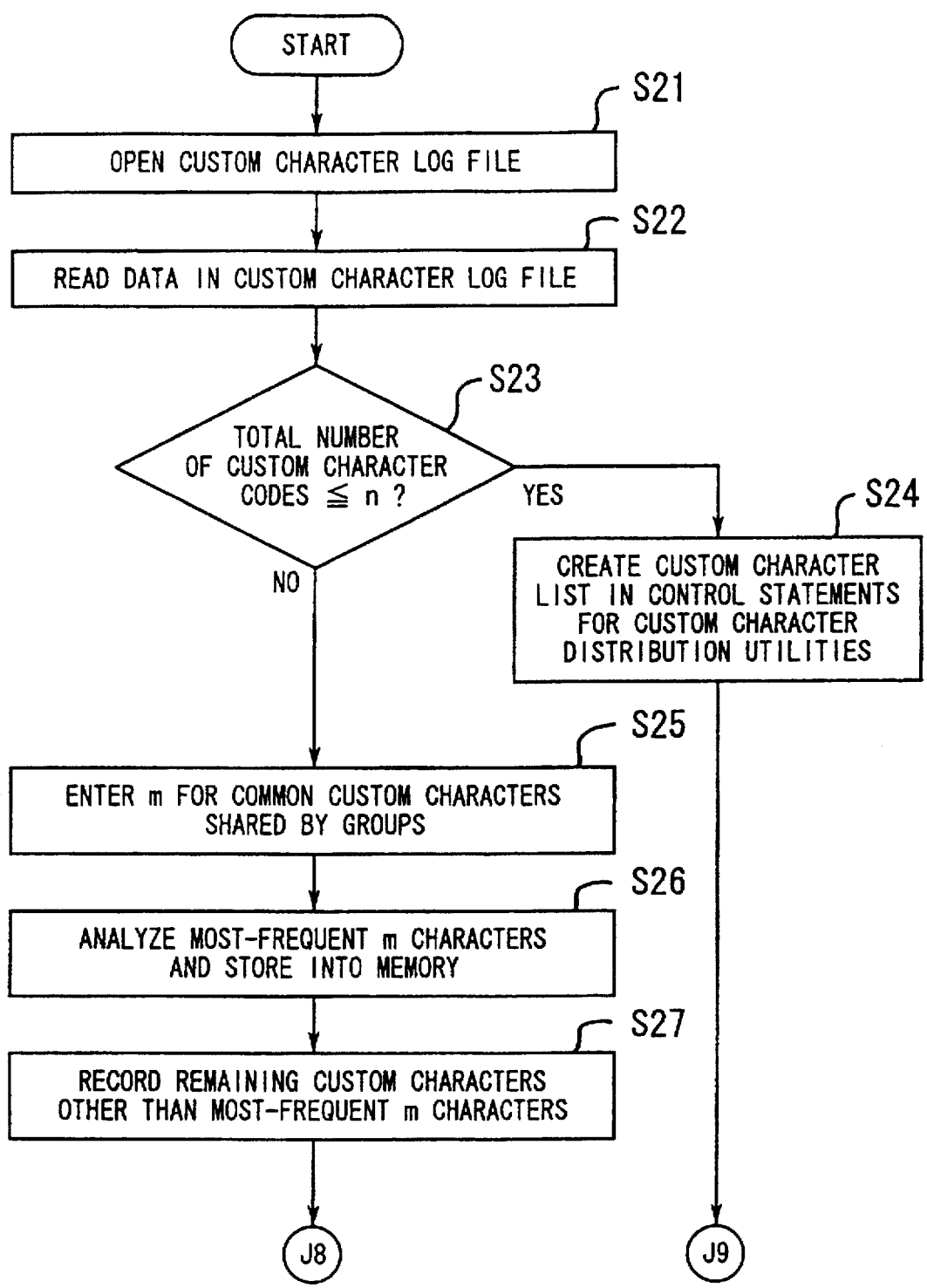
FIGS. 8 and 9 are a first and second halves of flowchart showing a procedure of grouping the custom characters.
Figure 9:
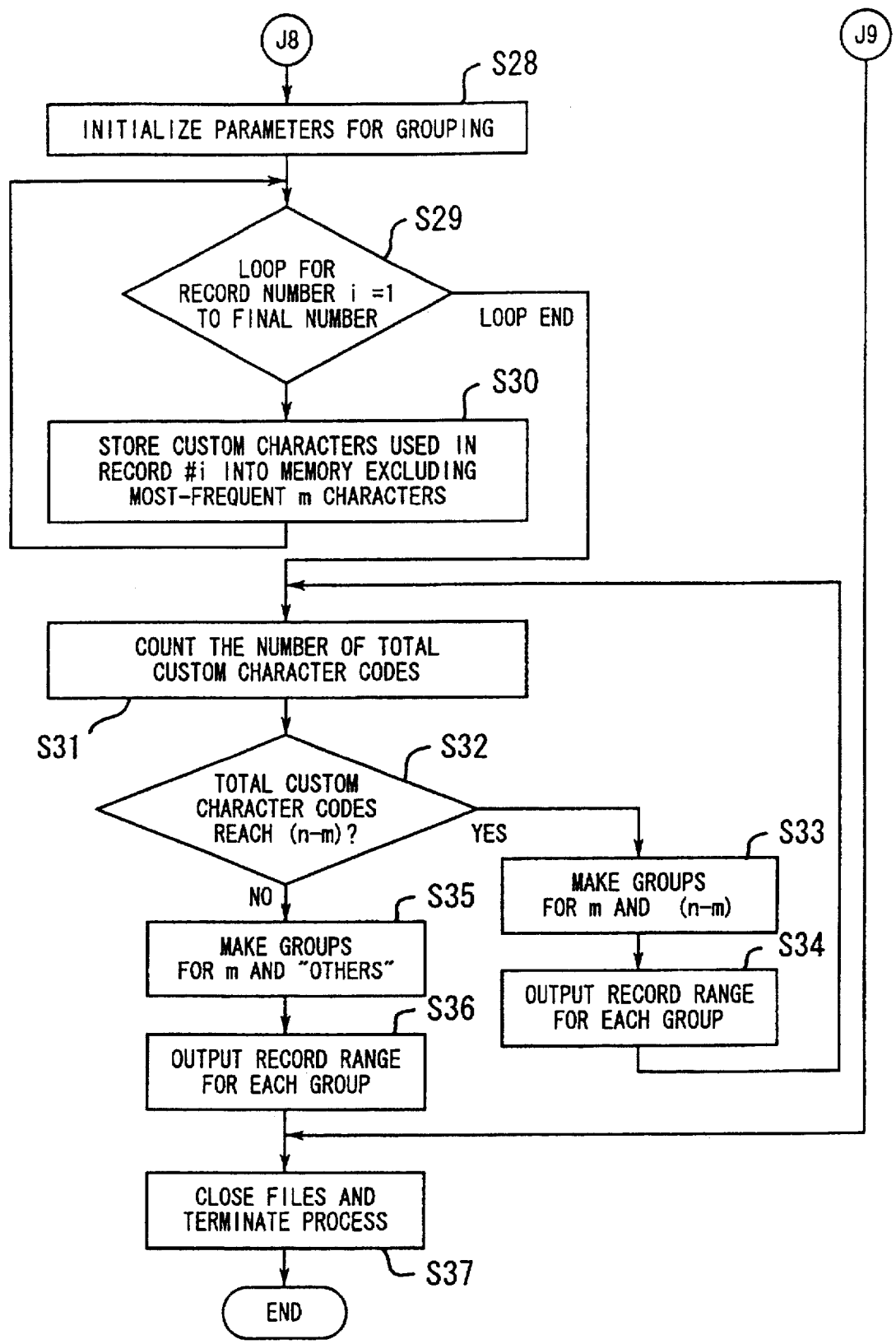

FIGS. 8 and 9 are flowcharts showing a procedure of grouping the custom characters based on the custom character log file obtained through the above steps S1–S11, which is carried out for each job-specific document file. The grouping process will proceed as:

[S21] The host computer 10 opens a job-specific custom character log file subject to grouping of the custom characters.

[S22] The host computer 10 extracts data in the opened custom character log file.

[S23] It is tested whether or not the total number of custom character codes used in the job-specific document file exceed n, where n is the maximum number of custom character codes that the personal computer 11 in the target system 2 can deal with. The following description assumes n=1880. If the total number of custom character codes is not greater than n, the process advances to the next step S24, and otherwise, the process branches to step S25.

[S24] Since the total number of custom character codes used in the job-specific document file is not greater than n (i.e., not greater than the number of custom character codes that the personal computer 11 in the target system 2 can handle), the personal computer 11 can register all the custom characters. Therefore, the host computer 10 makes a custom character group that contains all the custom characters used in the job-specific document file and creates a custom character list based on the custom characters in that group. This custom character list will be written in the form of control statements for custom character distribution utilities. Specifically, the list is created by listing all the custom characters in the group and then adding to them the corresponding codes to be used in the target system 2.

[S25] Since the total number of custom character codes used in the job-specific document file exceeds the critical number n (i.e., greater than the number of custom character codes that the personal computer 11 in the target system 2 can handle), the custom characters in the document file should be divided into smaller groups. To make this division, the custom characters will be first classified into two sets; one is a common custom character set that are commonly used in most groups, and the other is a specific custom character set that belongs only to a specific group (or to specific groups). Accordingly, a parameter m to indicate the total number of this common custom character set is introduced here.

The parameter m is of course smaller than the number n of custom character codes that the personal computer 11 in the target system 2 can handle. Giving a relatively large number to the parameter m will reduce the frequency of switching the custom character group as described later on, but increase the number of groups. As opposed to this, assigning a relatively small number to the parameter m will reduce the number of groups but the custom character group should be switched to another more frequently.

[S26] The custom character codes are sorted in the order of frequency in use according to the data of the "number of instances" extracted from the job-specific custom character log file in step S22. FIG. 10 shows an example of custom character codes sorted as such. This example indicates that the job-specific document file uses 2,000 kinds of custom character codes in total.

The most frequent m character codes ranked at the first to m-th in the sorted list are extracted and saved as the common custom character set.

[S27] The host computer 10 extracts all the remaining characters rated at the (m+1)th and later. In other words, those characters are regarded as "less-frequent custom characters." For each code of those less-frequent custom characters, the host computer 10 lists the record numbers of the records where it appears, based on the data extracted from the job-specific custom character log file.

[S28] Preparing for grouping operations in the upcoming steps S29–S36, the host computer 10 initializes grouping data including record numbers, character counts, and so on.

[S29] Incrementing the record number i from 1 to the final record number, the process repeats the following step S30. The present explanation assumes the final record number to be 273. When the process has finished the final record, it proceeds to the next step S31.

[S30] For each record number i (i=1, 2, ..., 273), the host computer 10 lists the less-frequent custom characters, based on the list obtained in step S27. FIG. 11 shows the result of such listing operations executed for the records #1 to #273.

[S31] Scanning the list obtained in step S30 from the first record, it is counted how many kinds of characters are listed therein as the less-frequent custom characters. Note that when the process has returned here from step S34, the host computer 10 will disregard the finished records and start counting from the middle of the list.

[S32] If the count obtained in step 31 has reached (n-m), the process goes to the next step S33 and, if the count has not reached (n-m) when the data for the final record number is processed, the process jumps to step S35.

FIG. 12 illustrates a case that the less-frequent custom characters are divided into three groups. That is, the count of the less-frequent custom characters has reached (n-m) as a result of the first execution of steps S31 and S32 for the records #1–#89. The process then proceeds to steps S33 and S34, and returns to step S31. The second execution of steps S31 and S32 results in counting (n-m) custom characters for the records #90–#145 and the process proceeds to steps S33 and S34. However, the third execution cycle of step S31 and S32 finally yields the count not greater than (n-m) for the records #146–#273. Accordingly, the process advances to step S35.

Figure 13:
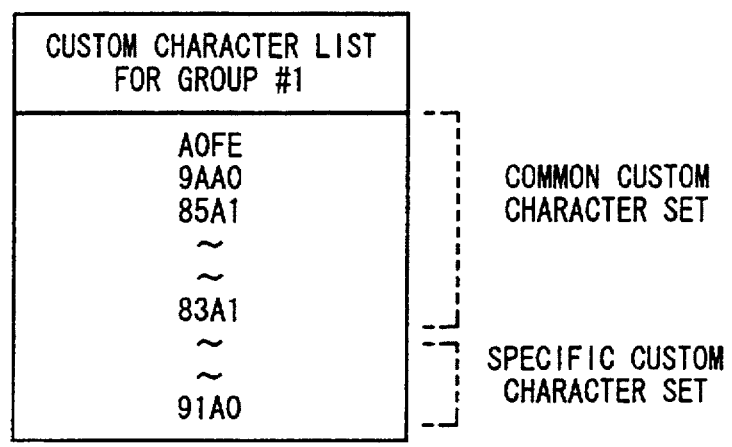
FIG. 13 is a diagram showing a custom character list of group #1.
Figure 14:
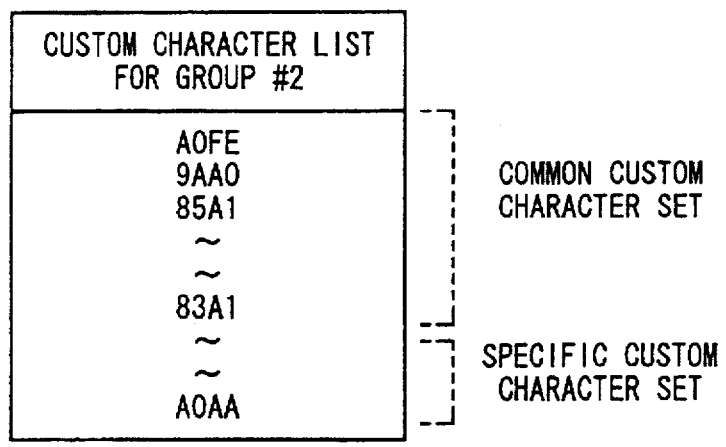
FIG. 14 is a diagram showing a custom character list of group #2.

[S33] Combining the m common custom characters saved in step S26 and the (n-m) specific custom characters obtained through steps S31 and S32, the host computer 10 organizes a custom character group and outputs it as a new custom character list. As shown in FIG. 13, for example, this newly-organized group #1 consists of the common custom character set including the codes A0FE-83A1 and the specific custom character set including the codes 91A0 and the like. Similarly to the group #1, group #2 will be organized, as shown in FIG. 14, with the common custom character set including the common codes A0FE-83A1 and another specific custom character set including the codes A0AA and the like.

[S34] For each of the groups organized as above, the host computer 10 outputs a range of the record numbers relevant to the records which contains any of the specific custom characters that belong to the group. As FIG. 16 illustrates, the host computer 10 reports that a record range #1–#89 corresponds to the group #1 and another record range #90–#145 to the group #2.

Figure 15:
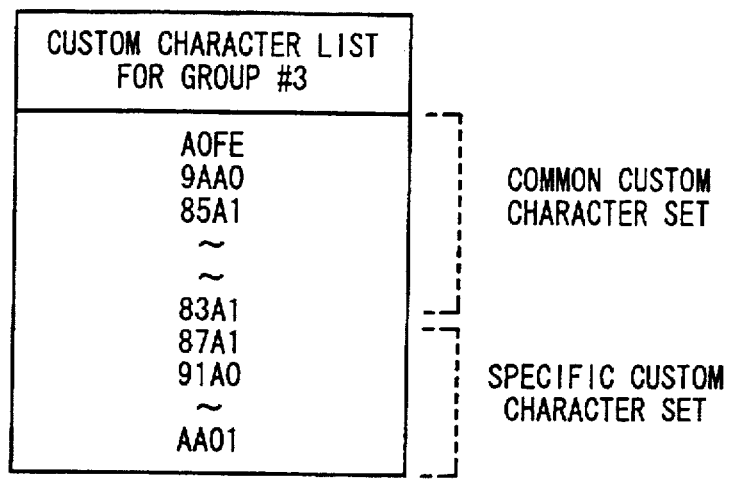
FIG. 15 is a diagram showing a custom character list of group #3.

[S35] Combining the m common custom characters saved in step S26 and a specific custom character set consisting of less than (n-m) characters obtained through the final execution of steps S31 and S32, the host computer 10 organizes a custom character group and outputs it as a new custom character list. As shown in FIG. 15, for example, the last group #3 consists of the common custom character set including the codes A0FE-83A1 and the specific custom character set including the codes 87A1-AA01.

[S36] The host computer 10 outputs a range of the record numbers relevant to the records which contains any of the specific custom characters that belong to the group lastly organized in step S35. As FIG. 16 illustrates, the host computer 10 reports that a record range #146–#273 corresponds to the group #3.

[S37] The host computer 10 terminates the process by closing the custom character log file opened in step S21 and the like.

Through the above-described process, when the total number of custom character codes used in the job-specific document file is not greater than the maximum number n of custom characters that the personal computer 11 in the target system 2 can handle, the host computer 10 treats the custom characters used in the job-specific document file as a whole for making a custom character group to create a custom character list, as described in step S24. On the other hand, when the total number of custom character codes used in the job-specific document file exceeds the maximum number n of custom characters that the personal computer 11 in the target system 2 can handle, the requested custom characters are divided into a plurality of groups through the process described in steps S33–S36, and a plurality of custom character lists are generated from those groups. Finally, the control statements are created to associate those custom character lists with the custom character codes.

Figure 17:
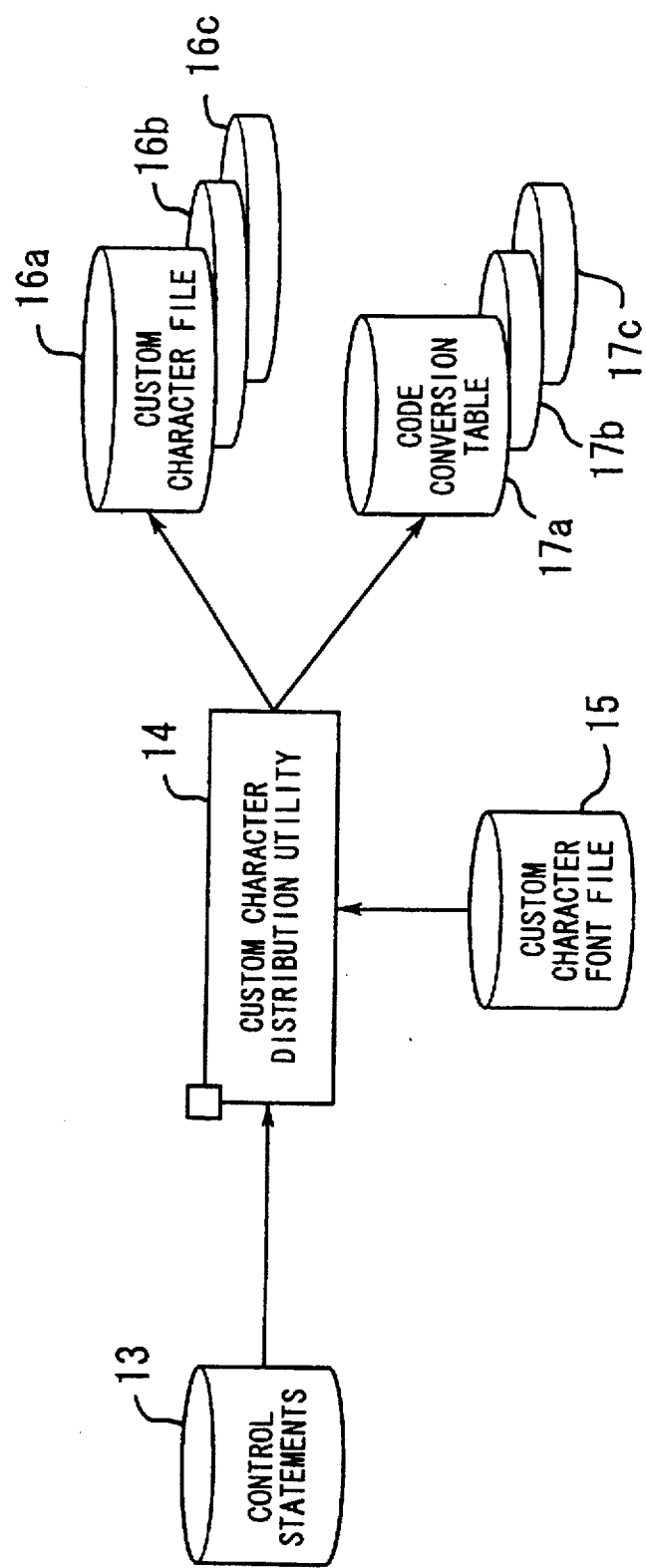
FIG. 17 is a diagram showing a transfer operation of the custom characters by a host computer.

FIG. 17 shows how the host computer 10 produces and transfers the aforementioned custom character files and code conversion tables based on the control statements. That is, the host computer 10 executes a custom character distribution utility 14 based on control statements 13. Custom character files 16a–16c and code conversion tables 17a–17c are thereby produced according to the control statements 13 and a custom character font file 15. Those custom character files 16a–16c and code conversion tables 17a–17c are then transferred to the personal computer 11 to provide it with a plurality of custom character environments specialized in the respective jobs. More specifically, the custom character file 16a and code conversion table 17a will provide a custom character environment "A." Similarly, the custom character file 16b and code conversion table 17b will provide a custom character environment "B" and the custom character file 16c and code conversion table 17c will provide a custom character environment "C."

Incidentally, FIG. 17 illustrates a system where the custom character files 16a–16c are directly transferred by the custom character distribution utility 14 under the control of the control statements 13. As an alternative solution, the system can be configured such that some intermediate files are once created from the control statements 13 for purposes of custom character transmission, and the intermediate files are sent to the personal computer 11, where some custom character linkage utility software will create the custom character files from the intermediate files.

The custom character file 16a is equivalent to the custom character file 11a for the job "A" shown in FIG. 2, while the code conversion table 17a corresponds to the code conversion table 11b for the job "A" in FIG. 2. Similarly, the custom character file 16b and code conversion table 17b correspond to the custom character file 11h and code conversion table 11f for the job "B" shown in FIG. 3, and the custom character file 16c and code conversion table 17c correspond to the custom character file 11h and code conversion table 11i for the job "C" shown in FIG. 4.

Figure 18:
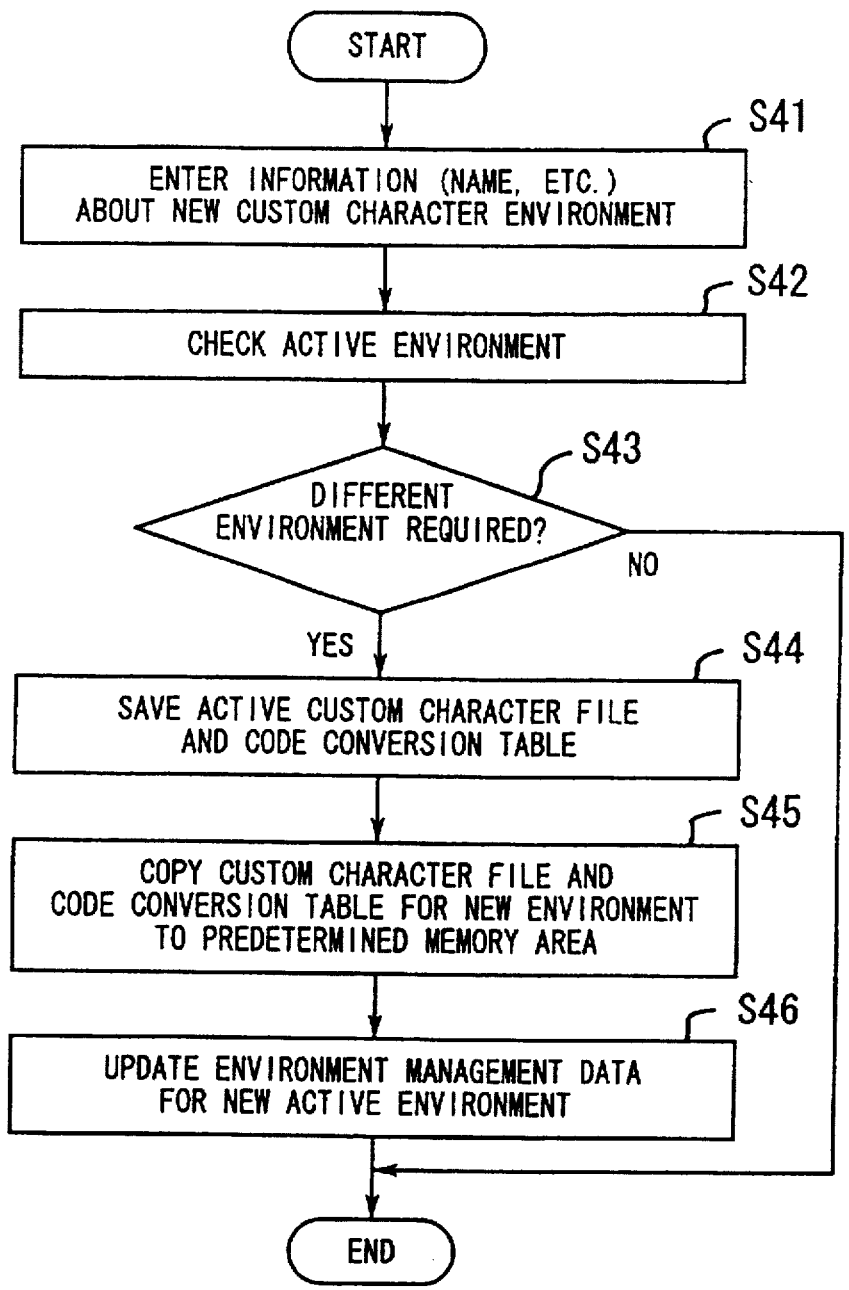
FIG. 18 is a flowchart showing a procedure of switching custom character environment.

FIG. 18 is a flowchart showing a procedure of switching the custom character environment in the personal computer 11. The following description will explain the procedure in the order of its step numbers.

[S41] The name of a custom character environment that is newly requested is entered in accordance with a designation from the source system 1. That is, the source system 1 designates what environment is required for the personal computer 11 to receive a certain document file. The personal computer 11 should establish a new custom character environment according to the designation.

[S42] The personal computer 11 checks what environment is currently activated.

[S43] If it is found, as a result of step S42, that the newly-requested environment is different from the active environment, the process advances to the next step S44. If the two are the same, the process will be terminated since there is no need to change the active custom character environment.

[S44] The custom character file and code conversion table that are currently used are saved to a predetermined area for backup.

[S45] Another custom character file and code conversion table for the new environment are copied to a predetermined area for use.

[S46] Environmental management data is updated to indicate that the new environment has been copied to the predetermined area.

Figure 19:
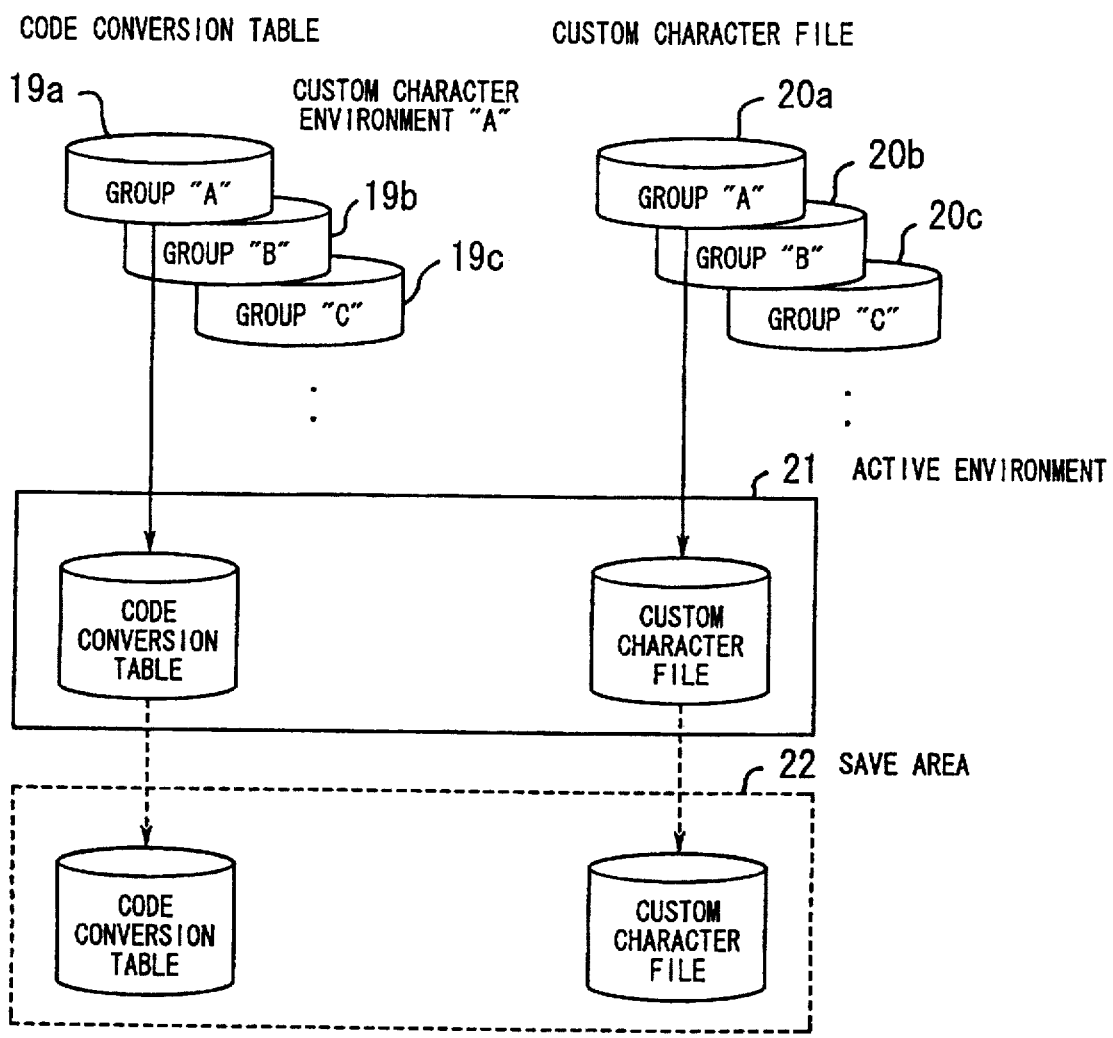
FIG. 19 is a diagram illustrating the switching of the custom character environment.

The above-described operation that switches the custom character environment will be now described below by way of example shown in FIG. 19. It is assumed that the personal computer 11 stores a plurality of custom character environments "A," "B," and "C" which are previously transferred from the host computer 10. The custom character environment "A" consists of a code conversion table 19a and custom character file 20a for a custom character group "A." Similarly, the environment "B" consists of a code conversion table 19b and custom character file 20b for a group "B," and the environment "C" consists of a code conversion table 19c and custom character file 20c for a group "C."

Upon request, the personal computer 11 calls up one of the above custom character environments and locates their copy to a predetermined area to establish an active environment 21. Instead, the old custom character environment having been in the predetermined area is moved to a save area 22 in preparation for reactivation in future.

In the way described above, the document files sent from the host computer 10 will be printed out and displayed on a screen under the custom character environment in the personal computer 11.

As shown in FIGS. 8 and 9, when the number of custom characters in a job-specific custom character group exceeds the maximum number that the target system 2 can handle, the system in the present embodiment further divides the group using the record as a dividing unit, or a minimum data segment. Considering that the custom characters used in the job-specific documents may change with the passage of time, it is also possible to introduce an alternative grouping method that treats the job-specific documents on a year-by-year basis; i.e., the custom characters are divided into groups according to the generation of documents.

Furthermore, the present embodiment shows only one unit of personal computer 11 in the target system 2, however, the target system 2 may employ a plurality of personal computers that have structure and functions equivalent to the personal computer 11.

In conclusion, according to the present invention, the custom characters are first divided into some groups to establish a custom character environment specialized in a specific group of custom characters, and under that environment, document data using the specific custom character group will be distributed for printing and displaying purposes. This structural arrangement will promise correct print and display outputs, even when the document data is distributed from a system having full capability to handle the custom character codes to another system capable of handling only a limited number of custom character codes. The present invention further allows to set up the custom character environment adaptive to the job-specific documents, thus enabling effective use of the custom characters in each job.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for enhanced utility of custom characters in a distributed data processing system, which allows document data to be distributed from a source system including a first character coding system to a target system including a second character coding system different than the first character coding system, the first and second character coding systems respectively having first and second predetermined code spaces reserved for assignment of the custom characters, the second predetermined code space being smaller in capacity than the first predetermined code space, the system comprising:

custom character grouping means, disposed in the source system, for dividing the custom characters available in the first predetermined code space into a plurality of custom character groups so that the custom character codes included in each of said custom character groups will not be greater in number than the custom character codes that the target system can handle with the second predetermined code space;

custom character environment creating means, disposed in the source system, for creating a plurality of custom character environments each corresponding to the plurality of custom character groups produced by said custom character grouping means, each of the plurality of character environments including a custom character file containing font pattern data of the custom characters and a code conversion table enabling the custom characters in the first character coding system to be partly adapted to the second character coding system by assigning one of the custom character groups to the second predetermined code space;

custom character environment setting means, disposed in the target system, for setting up one of said plurality of custom character environments in the target system; and document data processing means, disposed in the target system, for processing the document data sent from the source system under the custom character environment set up by said custom character environment setting means.

2. A system according to claim 1, wherein said custom character grouping means divides the custom characters available in the source system into said plurality of custom character groups according to an applicable job.

3. A system according to claim 2, wherein said custom character grouping means, when one of said plurality of custom character groups divided into according to the applicable job is expected to have more custom character codes than the target system can handle, divides the document data into a plurality of data segments, makes an examination of the custom characters used in said segments as well as of frequency in use of the custom characters in the document data, and creates said plurality of custom character groups based on results of said examination.

4. A system according to claim 1, further comprising custom character environment reading means, disposed in the target system, for reading said custom character file and said code conversion table for one of said plurality of custom character environments to send to said custom character environment setting means upon request from the source system.

5. A system according to claim 1, further comprising custom character environment sending means, disposed in the source system, for sending said custom character file and said code conversion table for each of said plurality of custom character environments to said custom character environment setting means.

6. A system according to claim 1, wherein said custom character environment setting means, when said custom character environment has been previously set in the target system and a new custom character environment to be newly set therein is different from said previously set custom character environment, evacuates said custom character file and said code conversion table for said previously set custom character environment from a predetermined memory area, and copies another custom character file and another code conversion table for said new custom character environment to the predetermined memory area.

7. An apparatus comprising:

a source computer including a first character coding system comprising a first predetermined code space reserved for assignment of custom characters, said source computer dividing the custom characters into a number of custom character groups and including custom character environments each corresponding to a respective one of the custom character groups and including a custom character file containing font pattern data of the custom characters and a code conversion table; and a target computer including a second character coding system comprising a second predetermined code space reserved for assignment of custom characters and smaller in capacity than the first predetermined code space, wherein the number of custom character groups is selected based on the second predetermined code space, the code conversion table enables the custom characters to be partly adapted to the second character coding system by assigning one of the custom character groups to the second predetermined code space, said target computer sets up one of the custom character environments in the target computer, and said target computer processes document data transmitted from the source computer to the target computer under the custom character environment set up in the target computer.

* * * * *